United States Patent [19]

Baret

[11] Patent Number: 5,226,314
[45] Date of Patent: Jul. 13, 1993

[54] TRACER-GAS LEAK DETECTOR

[75] Inventor: Gilles Baret, Annecy, France

[73] Assignee: Alcatel Cit, Paris, France

[21] Appl. No.: 775,757

[22] Filed: Oct. 15, 1991

[30] Foreign Application Priority Data

Oct. 15, 1990 [FR] France ................................ 90 12676

[51] Int. Cl.$^5$ ........................ G01M 3/04; G01M 3/20
[52] U.S. Cl. .................................................. 73/40.7
[58] Field of Search ..................................... 73/40.7

[56] References Cited

U.S. PATENT DOCUMENTS

| | | | |
|---|---|---|---|
| 3,672,207 | 6/1972 | Cramp et al. | 73/40.7 |
| 3,948,083 | 1/1976 | Wickham . | |
| 4,051,715 | 8/1977 | Ledeen et al. . | |
| 4,735,084 | 4/1988 | Fruzzetti | 73/40.7 |
| 4,984,450 | 1/1991 | Bürger | 73/40.7 |
| 5,107,697 | 4/1992 | Tallon et al. | 73/40.7 |

FOREIGN PATENT DOCUMENTS

| | | |
|---|---|---|
| 0268777 | 6/1988 | European Pat. Off. . |
| 0330175 | 8/1989 | European Pat. Off. . |
| 2016076 | 10/1970 | Fed. Rep. of Germany . |
| 1177707 | 9/1985 | U.S.S.R. . |
| 1516814 | 10/1989 | U.S.S.R. . |

Primary Examiner—Hezron E. Williams
Assistant Examiner—George Dombroske
Attorney, Agent, or Firm—Sughrue, Mion, Zinn, Macpeak & Seas

[57] ABSTRACT

The invention provides a tracer-gas leak detector including a secondary pumping set, a sole primary pumping set, a mass spectrometer connected to the inlet of the secondary pumping set, the outlet of the secondary pumping set being connected to the inlet of the primary pumping set by means of a duct equipped with an electromagnetic valve, and at least one pipe connecting a coupling for connection to an enclosure to be tested to the secondary pumping set, said pipe being equipped with a pneumatic valve which is opened by suction, wherein a buffer volume is connected both to a suction inlet of the primary pumping set by a link duct equipped with a first electrically actuated valve, and also to said pneumatic valve by a control duct equipped with a second electrically actuated valve.

4 Claims, 1 Drawing Sheet

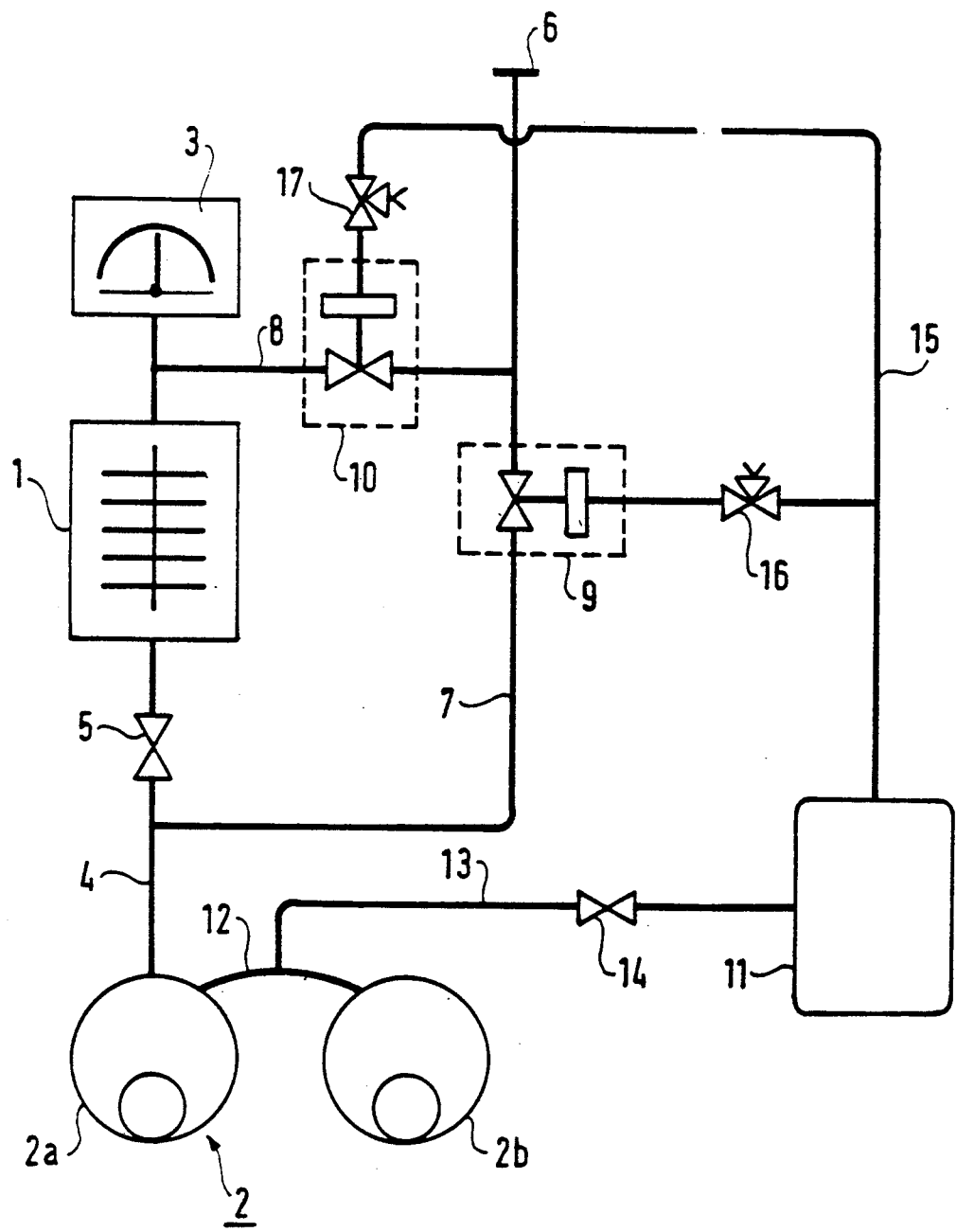

1

TRACER-GAS LEAK DETECTOR

The present invention relates to a tracer-gas leak detector.

BACKGROUND OF THE INVENTION

In a leak detector, the ducts connecting the various components do not all have the same diameters.

In particular, the duct(s) connecting the enclosure to be tested to the secondary pumping set is/are larger in diameter than, for example, the duct connecting the primary pumping set to the secondary pumping set. In an automatic detector, it follows that the valves situated on the different ducts do not all have the same pass diameters.

Although for low-conductance ducts having inside diameters of less than 10 mm, electromagnetic valves are relatively cheap and compact, on high-conductance ducts having inside diameters for example in the range 16 mm to 40 mm depending on the circumstances, electromagnetic valves are bulky and expensive.

However, in portable detectors, electromagnetic valves are used on all the ducts. In contrast, pneumatic valves are used for the large valves of console-mounted detectors, which pneumatic valves are actuated by an air compressor or by an air suction source included in the detector itself.

However, such a solution may hardly be applied to portable detectors because of the resulting increase in volume and in weight, as well as the increase in cost and in energy consumption.

An object of the invention is, therefore, to provide a solution to this problem and the invention applies particularly, but not necessarily, to portable detectors.

SUMMARY OF THE INVENTION

The invention therefore provides a tracer-gas leak detector including a secondary pumping set, a single primary pumping set, a mass spectrometer connected to the inlet of the secondary pumping set, the outlet of the secondary pumping set being connected to the inlet of the primary pumping set by means of a duct equipped with an electromagnetic valve, and at least one pipe connecting a coupling for connection to an enclosure to be tested to the secondary pumping set, said pipe being equipped with a pneumatic valve which is opened by suction, wherein a buffer volume is connected both to a suction inlet of the primary pumping set by a link duct equipped with a first electrically actuated valve, and also to said pneumatic valve by a control duct equipped with a second electrically actuated valve.

In a preferred embodiment, said primary pumping set comprises two stages in series, said link duct being connected to said primary pumping set between said two stages.

BRIEF DESCRIPTION OF THE DRAWINGS

A description of an embodiment of the invention is given below with reference to the sole FIGURE of the accompanying drawing.

DETAILED DESCRIPTION

The FIGURE shows a tracer-gas leak detector. It includes a secondary pumping set 1, e.g. a mechanical molecular pump set, a primary pumping set 2 constituted in the present case by two stages 2a and 2b connected in series, and a mass spectrometer 3.

The secondary pumping set 1 is connected to the primary pumping set 2 by a duct 4 equipped with an electromagnetic valve 5. The duct may have relatively low conductance since its inside diameter is, for example, less than 10 mm.

The detector further includes an inlet coupling 6 designed to be connected to an enclosure to be tested and connected both to the outlet of the secondary pumping set 1 by a first pipe 7 and also to the inlet of the secondary pumping set by a second pipe 8. These pipes are equipped with pneumatic valves 9 and 10 which are opened by suction. The detector described includes two pipes 7 and 8 and enables a gastightness test to be performed either by a helium counter current passing via pipe 7 or by a helium direct current passing via pipe 8. Naturally, the invention also applies in the case where the detector has only one of the pipes 7 or 8 providing, counter-current measurement only or direct current measurement only. The pipes 7, 8 are pipes having high conductance since their inside diameters may, for example, range from at least 16 mm to 40 mm. Electromagnetic valves for such diameters are costly and bulky. Pneumatic valves are therefore used.

In accordance with the invention, in order to control valve opening, the detector includes a buffer volume or buffer tank 11 having a capacity of about one liter, for example. The buffer volume 11 is connected to a suction inlet of the primary pumping set 2 (in this case, to the inlet 12 of stage 2b) by a link duct 13 equipped with a first electrically actuated valve 14. The buffer volume 11 is further connected to pneumatic valves 9 and 10 by a control duct 15. Respective electrically actuated valves 16, 17 enable the buffer volume 11 to be isolated from each of the pneumatic valves 9 and 10: a three-port valve 16 controls pneumatic valve 9 and a three-port valve 17 controls pneumatic valve 10. The link ducts 13 and the control ducts 15 are ducts used for control and they are therefore small in diameter, e.g. about 6 mm. The isolating valve 14 and the three-port control valves 16 and 17 are therefore small electrically-actuated valves which are compact, cheap, reliable, and economical on electrical power.

In this way, using the primary pumping set 2 only, the suction supplied by the high pressure stage 2b is used to evacuate the buffer volume 11 which serves as a "vacuum source" for opening the pneumatic valves 9 and 10.

The buffer volume 11 is evacuated when the apparatus is not effecting a leak-detection cycle. When the detector effects a pre-vacuum cycle, valve 14 is closed so as to prevent the pressure from building up again in the buffer volume. During all other operations, valve 14 remains open.

I claim:
1. In a tracer-gas leak detector for detecting leaks in an enclosure to be tested, said detector comprising a sole primary pumping set having a suction inlet and an outlet, a secondary pumping set having a suction inlet and an outlet, a mass spectrometer, a coupling for connection to said enclosure to be tested, a first duct connecting the outlet of the secondary pumping set to the suction inlet of said primary pumping set, a first electromagnetic valve in said first duct between said outlet of said secondary pumping set and said suction inlet of said primary pumping set, and at least one pipe connecting said coupling to one of said primary pumping set and secondary pumping set, and a first pneumatic valve opened by suction in said at least one pipe between said coupling and said one pumping set, the improvement further comprising:

a buffer tank, a link duct equipped with a first electrically actuated valve connecting said buffer tank to said suction inlet of the primary pumping set, and a control duct equipped with a second electrically actuated valve connecting said buffer tank to said first pneumatic valve, whereby selectively, using only the primary pumping set, the primary pumping set may operate to evacuate the buffer tank and allow the buffer tank to serve as a vacuum source for opening said first pneumatic valve when said tracer-gas leak detector is not effecting a leak detection cycle, and wherein, with the second electrically actuated valve selectively closed, the detector may effect a pre-vacuum cycle so as to prevent the pressure from building up again in said buffer tank.

2. A leak detector according to claim 1, wherein said primary pumping set comprises two stages disposed in series, and said link duct is connected to said primary pumping set between said two stages.

3. A leak detector according to claim 1, wherein said at least one pipe comprises a first pipe and a second pipe, wherein said first pipe is operatively connected at one end to said inlet coupling and at an opposite end to the suction inlet of said primary pumping set, and wherein said second pipe is operatively connected at one end to said coupling and is connected at an opposite end to the suction inlet of said secondary pumping set, wherein said first and second pipes respectively include said first pneumatic valve and a second pneumatic valve, and each pneumatic valve is opened by suction, and wherein said control duct includes remote from said buffer tank two branches operatively coupled, via electrically actuated valves, to respective pneumatic valves within said first and second pipes, wherein by selective operation of said pneumatic valves, said inlet coupling is alternatively coupled to the suction inlet of said primary pumping set through said first pipe and to the suction inlet of said secondary pumping set through said second pipe when said detector is in a gas-leak detection mode.

4. A leak detector according to claim 3, wherein said primary pumping set comprises two stages disposed in series, and said link duct is connected to said primary pumping set between said two stages.

* * * * *